United States Patent [19]

Parigger et al.

[11] Patent Number: 5,323,870
[45] Date of Patent: Jun. 28, 1994

[54] ADJUSTABLE VISCOUS SHEAR COUPLING FOR AN ALL-WHEEL DRIVE VEHICLE AND A PROCESS FOR ITS CONTROL

[75] Inventors: Martin Parigger, Eggersdorf; Gerhard Müllner, Graz; Johann Rieger, Bärnbach; Robert Schaffernak, Weiz; Hermann Pecnik, Nestelbach, all of Austria

[73] Assignee: Steyr-Daimler-Puch AG, Vienna, Austria

[21] Appl. No.: 964,248

[22] Filed: Oct. 21, 1992

[30] Foreign Application Priority Data

Oct. 21, 1991 [EP] European Pat. Off. ........ 91117925.7

[51] Int. Cl.⁵ .................... B60K 23/08; B60K 28/16; B60K 17/348
[52] U.S. Cl. ................................. 180/197; 180/233; 180/247; 180/248; 192/35; 192/58 C; 192/59; 364/426.03
[58] Field of Search ............... 180/197, 233, 247, 248, 180/249; 192/60, 58 C, 58 B, 59, 35; 364/426.03

[56] References Cited

U.S. PATENT DOCUMENTS

| | | |
|---|---|---|
| 4,942,951 | 7/1990 | Kriebernegg et al. |
| 5,197,583 | 3/1993 | Sakai et al. ............................. 192/35 |
| 5,203,439 | 4/1993 | Peier .................................. 192/58 C |
| 5,211,257 | 5/1993 | Shuzo et al. ........................ 180/248 |
| 5,251,719 | 10/1993 | Eto et al. ............................. 180/248 |

FOREIGN PATENT DOCUMENTS

| | | |
|---|---|---|
| 0332608 | 3/1989 | European Pat. Off. |
| 0357074 | 3/1990 | European Pat. Off. |
| 3505455 | 8/1986 | Fed. Rep. of Germany |
| 3626025 | 3/1987 | Fed. Rep. of Germany |
| 3935723 | 5/1990 | Fed. Rep. of Germany |

OTHER PUBLICATIONS

Brochure, "Viscomatic" (1991), Frankfurt Automobile Exposition, Sep. 12 to Sep. 22, 1991.
"Die Viscomatic ... Generation", vol. 90, No. 10, 1988 pp. 535–542; p. 536; p. 538.

*Primary Examiner*—Mitchell J. Hill
*Attorney, Agent, or Firm*—Meltzer, Lippe, Goldstein

[57] ABSTRACT

A viscous shear coupling for distributing torque between front and rear axles of an all-wheel drive vehicle is provided which comprises a housing, a set of inner blades interdigitating with a set of outer blades, the inner and outer blades being axially spaced apart from each other and axially slidably mounted within the housing, a viscous liquid located within the housing, an adjusting piston within the housing which is axially displaceable so as to adjust the axial distance between adjacent inner and outer blades. The viscous shear coupling further includes a control pressure circuit for delivery of a control pressure fluid to the adjusting piston, a control valve for regulating the delivery of the control pressure fluid to the adjusting piston, and a control device (e.g., a microprocessor) which calculates a desired adjusting piston speed based on driving conditions and adjusts a valve current delivered to the control valve in order to obtain the desired adjusting piston speed. A process for controlling the viscous shear coupling includes acquiring a set of signals indicative of driving conditions and converting them to a set of input parameters, converting the input parameters to a set of basic parameters, ascertaining a set of control deviations from the basic parameters and the input parameters, calculating the desired adjusting piston speed from the control deviations, and adjusting the valve current delivered to the control valve in order to obtain the desired adjusting piston speed.

27 Claims, 7 Drawing Sheets

ADJUSTABLE VISCOUS SHEAR COUPLING FOR AN ALL-WHEEL DRIVE VEHICLE AND A PROCESS FOR ITS CONTROL

BACKGROUND OF THE INVENTION

The instant invention relates to an adjustable viscous shear coupling and to a process for distributing the driving power between the axles of an all-wheel drive vehicle. The viscous shear coupling is adjusted by shifting a regulating piston of the viscous shear coupling by means of a control circuit containing a control valve on the basis of signals determined as a function of driving conditions.

A controllable viscous shear coupling system to drive a motor vehicle with two driven axles is known for example from the present assignee's EP-PS 332 608 (U.S. 4,942,951), wherein the coupling is located in the drive train towards the rear axle and is combined with a planetary gear system. Control is effected by means of hydraulic shifting of an adjusting piston in the coupling which changes the distances between disks. The design of the control system and its manner of operation for controlling movement of the piston is not described in that document.

DE-OS 36 26 025 discloses a control arrangement for a multiple disk friction clutch for the hydraulically controlled hook-up of the front wheel drive of a motor vehicle. In this control arrangement, a signal for the control of a valve is derived from signals determined as a function of driving conditions, said signal determining the contact pressure in the multiple disk clutch. The control device merely compares the difference between rotational speeds of the axles with a comparison value determined as a function of speed and steering angle and calculates from this a desired driving torque for the hooked-up front axle through multiplication by various coefficients, depending on whether the difference in axle speeds is above or below the comparison value. This desired value is then set by changing the pressure in the hydraulic control circuit.

Aside from the fact that this latter control arrangement involves a friction clutch with a different action and adjustment behavior from a viscous shear coupling, essential factors such as driving dynamics (e.g. engine torque) and driving conditions are not taken into consideration. As a result, the control reacts only to the slip so to say trailing behind it, and is therefore relatively sluggish so that the possibilities of variable driving power distribution are not utilized with respect to traction nor with respect to driving safety.

A similar drive arrangement with multiple-disk clutch is also known from DE-PS 35 05 455. Although in this device the control does take several factors of driving dynamics into consideration, among them tire defects, the clutch can only be opened completely or closed completely.

It is therefore the object of the instant invention to provide an adjustable viscous shear coupling and a regulating process for it making it possible to achieve driving power distribution control that would be as precise as possible, would reflect the physical conditions, and would be as rapid as possible and to some extent even anticipatory, while at the same time reflecting as precisely as possible all essential factors of driving dynamics.

SUMMARY OF THE INVENTION

In accordance with the present invention, a viscous shear coupling for distributing torque between front and rear axles of an all-wheel drive vehicle is provided which comprises a housing, a set of inner blades interdigitating with a set of outer blades, the inner and outer blades being axially spaced apart from each other and axially slidably mounted within the housing, a viscous liquid located within the housing, an adjusting piston within the housing which is axially displaceable so as to adjust the axial distance between adjacent inner and outer blades. The viscous shear coupling further includes a control pressure circuit for delivery of a control pressure fluid to the adjusting piston, a control valve for regulating the delivery of the control pressure fluid to the adjusting piston, and a control device (e.g., a microprocessor) which calculates a desired adjusting piston speed based on driving conditions and adjusts a valve current delivered to the control valve in order to obtain the desired adjusting piston speed. A process for controlling the viscous shear coupling by the control device includes acquiring a set of signals indicative of driving conditions and converting them to a set of input parameters, converting the input parameters to a set of basic parameters, ascertaining a set of control deviations from the basic parameters and the input parameters, calculating the desired adjusting piston speed from the control deviations, and adjusting the valve current delivered to the control valve in order to obtain the desired adjusting piston speed.

Thanks to the combination of signal detection and signal processing, input signals are always available for subsequent steps in which they are in part used several times and are kept up-to-date independently of the course of the subsequent process and of the behavior over time of the different sensors and processing circuits. The basic parameters are used several times in the course of the control process and only need to be calculated once, thus shortening response time of the adjustment process.

Separate determination of different control deviations (e.g., drive slip, thrust slip, transversal slip) has the distinct advantage that all travel-dynamic control deviations are constantly monitored while individual malfunctions are not ignored by an upstream decision logic so that even extreme driving conditions can be taken into account. It is thus possible to cover easily additional relevant control deviations by the process in its further developments without substantial program changes.

It is furthermore an advantage of the inventive process that the different control deviations are available in a physically correct, precise and unaltered form and are combined into a single output parameter as late as possible in the course of the control process, after suitable filtering and weighing.

The calculation of a desired piston speed for the viscous shear coupling from the control deviations as the goal of the control process is an especially important and advantageous characteristic of the invention. It is thus not a desired pressure or a desired position of the adjustment piston in the viscous shear coupling that is to be found, but a parameter which is higher by one differentiation step. Thus, prior differentiation which would increase control deviations and errors of the basic signals is not required in the inventive control process. To make a rough comparison, a P controller would act as an I controller as a result of this measure. (A P controller is a proportional regulator which regulates a quantity, e.g., piston position, in proportion to the control deviation. An I controller regulates the quantity as a function of the integral of the control deviation.) In this manner very precise adjustment of the desired slip difference and thereby of the driving power is achieved, and this practically without control deviation. Very rapid and practically delay-free adjustment of the torque distribution is thus achieved. This advantage applied to a viscous shear coupling is especially important because the adjusting distance of the piston is relatively great in a viscous shear coupling.

The selection of piston speed as the adjustment parameter has the further advantage that it can be converted immediately and directly into a flow speed of hydraulic fluid (and thereby also into a flow-through cross-section of the control valve) and that the latter in turn very well matches the electrical current needed for the actuation of the control valve so that the output parameter of the control device is a desired electric valve current which can be adjusted very well and with very good timing characteristics in a closed control pressure circuit without position servo-control.

It is also especially advantageous that all control tasks can be carried out without the need for a piston position signal so that the function of the system is still maintained to a great extent in case of a sensor malfunction. Thus, under certain conditions, a piston position sensor can be omitted entirely for reasons of cost.

As part of the control process, it is advantageous to calculate tractive force based on an engine power adjustment element (throttle) position signal and an engine speed signal. These signals are used to determine the engine torque from a stored characteristic diagram and then to arrive at the tractive force through the drive transmission from the rotational speed of the front axle and the rotational speed of the engine instead of calculating the tractive force directly from engine power and speed of travel. In this manner the tractive force signal is somewhat in advance of the actual tractive force and thereby of a change in slip. It is also possible to achieve special safety effects (e.g. in case of signal malfunction) by taking into account a calculated gear transmission value.

By limiting the transmission value between two selected limit values, it is possible to avoid a strongly fluctuating and erroneous transmission value during coupling and start-up. By limiting the value of the transmission between the two limit values, obtaining a reasonable transmission value is assured even in case of signal malfunction.

Thus, when rotational front-axle speeds fall below a predetermined minimum value, the transmission can be set equal to a maximum transmission value or, in the case of low torque, the upper limit value of transmission can be selected so as to be lower than the actual transmission value in the lowest gear.

In a further development of the process according to the invention, a wheel defect can be detected as an additional basic parameter in that the fluctuations of certain parameters are first monitored according to predetermined conditions in a first initialization period and in that a median slip value is determined only then through integration over a predetermined distance, said median slip value representing in that case the measured value of the wheel defect. In this manner, differences in tire tread circumference can be recognized on front and rear axles as kinematically caused contributors to the measured slip and can be eliminated. This correction becomes especially precise under certain conditions and the integration over a given distance, and this is important in view of the high degree of precision of the overall control process.

The calculation of wheel defect can be further refined through certain measures. These measures are plausibility controls through which distortions of the wheel defect correction can be avoided through tire slip.

In a further development of the inventive process, the continuous ascertainment of the individual measured values for wheel defect becomes a filtration process after a certain number of measurements. A modified wheel defect, e.g. due to installation of a spare wheel or even an emergency wheel, is updated quite rapidly after the start of the motor vehicle and is then secured through continuous ascertainment without suppressing the influence of new measured values completely after a long period of travel.

In a further embodiment of the invention, a kinematically corrected slip value is obtained from the actual slip value by subtracting a kinematically caused slip portion during turns and possibly wheel defects, the value for the kinematically caused slip portion during turns being taken from stored performance characteristics.

Not only the steering geometry relationship but also the dynamic king pin inclination of the tires as a function of speed and direction of travel (forward, reverse) are taken into account.

In an advantageous further development of the process, a dynamic factor is calculated from the course of the tractive force over time and this dynamic factor is then treated as a control deviation. This improves response of the control when load conditions change suddenly by accelerating the adjusting piston in the direction of high transmitted torque when the accelerator pedal is suddenly depressed, and in the direction of low transmitted torque when the driver's foot is suddenly taken off the accelerator pedal, this being in effect the equivalent of a disturbance variable feedforward. The dynamic factor is a dimensionless number just like the other control deviations, and therefore equal treatment is justified also from the standpoint of physics. Thanks to this dynamic factor, the controls react so rapidly, almost anticipatory, so as to immediately make available optimal driving power distribution for travel behavior and driving safety.

In a further development of the process according to the invention, the control deviation of the adjusting piston position is read as a difference between a desired value of the adjusting piston position and the actual adjusting piston position, multiplied by an appropriate speed control factor. In this case, the desired values of the adjusting piston position are ascertained from stored characteristics as a function of travel speed, steering angle and tractive force and a maximum selection is then made from among the control deviations. This causes pre-positioning of the adjusting piston to a minimum position dependent upon the applicable state of travel. Thus the adjusting times for slip adjustment are reduced, thereby significantly improving the response behavior and reducing the necessary piston movement. Since pre-positioning involves the adjustment to a minimum position, slip control cannot deteriorate in the worst case.

In determining the drive slip control deviation, it is advantageous to first determine a desired drive slip value from the tractive force and a rotational speed dependent upon travel speed. The desired drive slip value is then determined through minimum selection from the difference between the kinematically corrected slip and the desired drive slip value on the one hand and from the difference between slip and a suitably selected positive minimum slip. It is the goal of drive slip adjustment to limit a positive slip difference between front and rear axles to a desired value as a function of tractive force and speed. The calculation of this slip value from the tractive force and from a rotational speed dependent upon travel speed provides the possibility to meet travel dynamic and control technological requirements in making this calculation. Thus control reacts "properly" even in extreme travel situations.

The obtention of drive slip control deviations from this by means of minimum selection ensures that no positive control deviations occur when the difference between front axle and rear axle speeds is negative. In this manner the driver is certain not to be bothered by controlling means fluctuations and distortions of the drive train due to wrong direction of torque flow such as could otherwise occur in the presence of negative kinematic slip parts.

It is also advantageous to determine a thrust slip control deviation by first calculating a desired thrust slip value from a rotational speed dependent upon travel speed and the steering angle and by then calculating the thrust slip control deviation by minimum selection from the difference between desired thrust slip value and the kinematically corrected slip on the one hand and from the difference between a negative minimum slip and the actual slip on the other hand. This thrust slip control causes negative slip differences in the engine brake operation to be caught and to be limited to a desired value as a function of steering angle and speed. Since the tractive force is not taken into account in determining the desired thrust slip value, this adjustment is also active in a drive situation so that influences from an erroneous traction force detection are excluded on the one hand, while on the other hand restarting an engine that was throttled during braking is assisted through the adjustment.

In addition, the transversal front axle slip control deviation can be ascertained in the course of the instant process in that first the slip between left and right front wheels, then the kinematically corrected transversal slip, then the desired transversal slip value and from this finally the difference between the kinematically corrected transversal slip and the desired transversal slip value are ascertained. Such a transversal slip adjustment reacts to excessive slip of the inside front wheel in a curve, mainly within the travel-dynamic zone and prevents in it fluctuations and erroneous reactions of drive slip control due to widely fluctuating wheel speeds.

In a further development of the process a brake control deviation can also be detected by first constituting a rotational reference speed representing the rotational speed by which the rear axle speed measured at the beginning of braking is reduced and from which the rear axle speed and then the brake control deviations are calculated. In this manner optimal redistribution of brake moments resulting from engine braking and easier operational braking are achieved, thus preventing engine thrust from causing excessive braking of the front wheels. However, in order to avoid also excessive braking of the rear axle by the driving system under all circumstances, the brake control deviation is determined from the rotational rear axle speed.

In an especially advantageous further development of the invention the desired piston speed is calculated from various individual control deviations by first finding the resulting control deviation by selecting a maximum from terms containing control deviations and analog magnitudes multiplied by control speed factors and by then calculating the desired piston speed according to a suitably selected function. Thanks to appropriate formation and constitution of the terms from which the maximum selection is to be made, all control deviations and analog magnitudes which are very precisely available are summed up into an end result in such manner that all driving and road conditions are taken into account. Through the selection of the adjustment speed factors, the adjustment speed is adapted to the changes of the adjusting distance as a function of driving conditions.

In a further refinement, provisions may be made for the control deviation to be derived by selection of a minimum from the brake slip control deviations and the thrust slip control deviation multiplied in either case by an adjusting speed factor. As a result the advantages of the all-wheel drive can be fully utilized even during braking without affecting the braking stability and the ABS suitability.

Further improvement of adjusting quality is achieved by individually filtering the various control deviations before forming the resulting control deviation. Most of the filtering required for untroubled adjusting behavior is therefore not carried out on the input signals but only on control deviations, as a special logic can be filtered here in view of minimizing the adjusting piston movement.

The viscous shear coupling system according to the instant invention is provided with a control device which includes a means for the calculation of a desired speed of the adjusting piston from signals that are specific to the driving conditions and with a control valve in the form of a proportional valve which directly sets the speed of the adjusting piston on the basis of the calculated desired value. This makes it possible for the entire viscous shear coupling system to react extremely rapidly and precisely under all driving conditions and thus combines a high degree of travelling comfort with maximum driving safety, even in extreme situations.

Finally, the aforementioned control device is suitably a microcomputer the memory of which contains the commands to carry out the entire process. In such a control device the advantages of the process are especially evident and the process can be carried out rapidly with relatively low outlay as measured by its thorough and comprehensive effect.

BRIEF DESCRIPTION OF THE DRAWINGS

The invention is explained below through drawings in which.

DETAILED DESCRIPTION OF THE INVENTION

Figure 1:
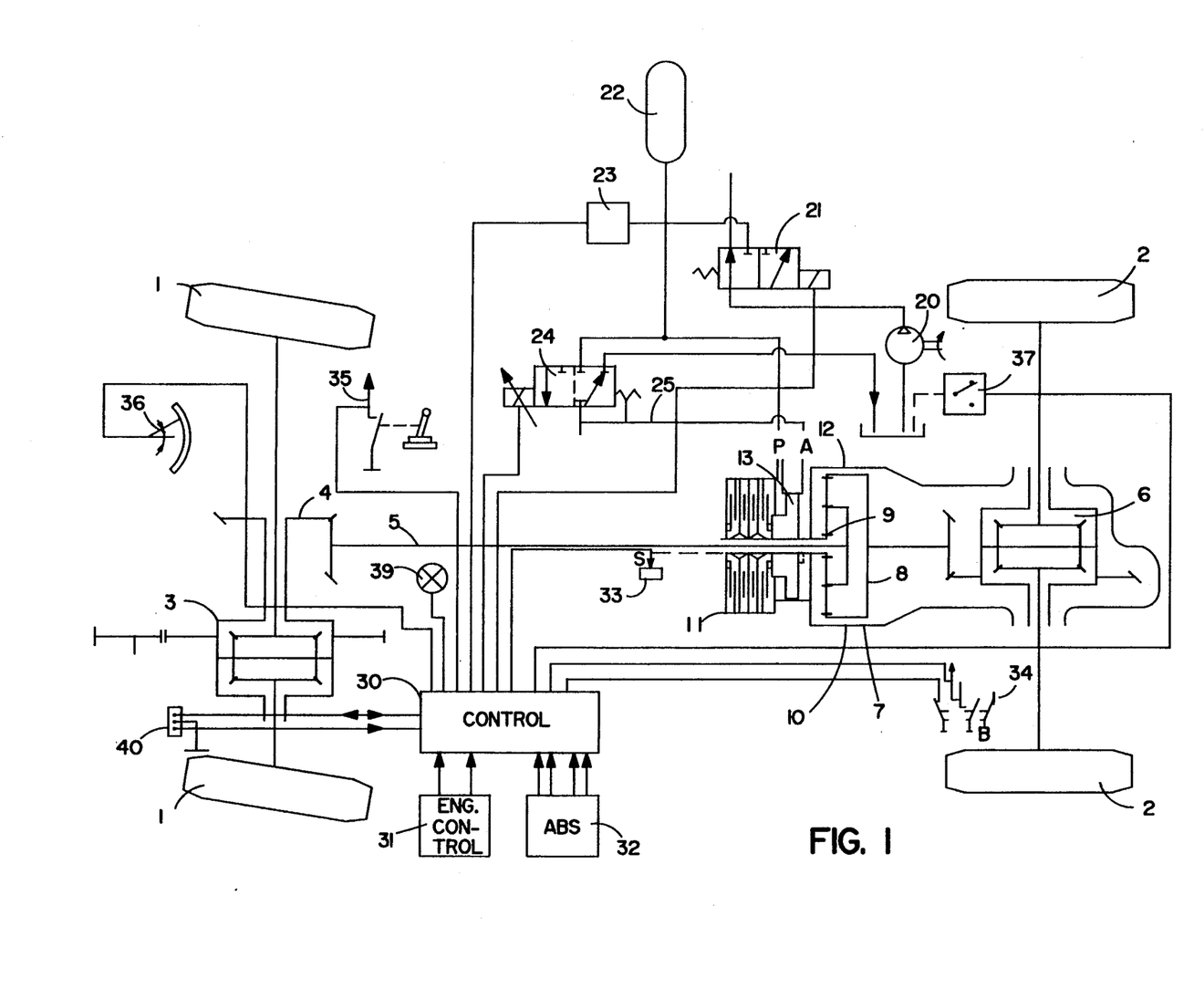
FIG. 1 is a schematic representation of an all-wheel drive vehicle with a viscous shear coupling system according to the invention suitable for carrying out the process according to the invention.

In the all-wheel drive vehicle shown schematically in FIG. 1 the front wheels are referenced by 1 and the rear wheels by 2. The driving force is transmitted from an engine gear unit (not shown) to the case 3 of a front axle differential and to a bevel gear 4 from which a drive train 5 extends to the drive of a rear axle differential 6. Before the rear axle differential 6 in this drive train 5 is a planetary gear set 7 driven via planet carrier 8. The sun gear 9 is connected to a controllable viscous shear coupling 11, while the ring gear 10 transmits the drive. It is also possible however to provide an arrangement whereby the planetary gear set 7 is connected in a different manner or is omitted entirely so that the drive acts directly via the viscous shear coupling or the viscous shear coupling and possibly also a planetary gear set 7 installed in a drive train going to the front axle.

The viscous shear coupling 11 is provided with a movable adjusting piston 13 in housing 12, said adjusting piston 12 being subjected to pressure via an oil pressure circuit 25. An oil pump 20 is provided for that purpose, said oil pump 20 pumping oil via a loading valve 21 and an oil pressure container 22 in which pressure is kept constant through the action of the loading valve 21 and a hydraulic pressure sensor 23. This oil pressure container 22 is connected via flow control valve 24 to circuit 25 and thereby to the viscous shear coupling 11. The valve 24 is controlled by a control device 30 which is shown in greater detail in FIG. 2. This control device 30 receives input signals from the following points:

- from the engine control device 31 it receives an engine output adjustment element setting (throttle position) signal ATR and an engine rotational speed signal SEN,
- from the ABS device 32 it receives the four wheel speed signals VFL, VFR, VRL, VRR,
- from an adjusting piston path sensor 33 it receives a piston position signal PVP,
- from brake light switch 34 it receives a braking signal BR_ON,
- from a sensor 35 on the shift lever it receives a reverse shift signal REV_ON,
- from a steering angle sensor 36 it receives a steering angle signal AST,
- from the hydraulic pressure sensor 23 it receives a hydraulic pressure signal PHY,
- from an oil level gauge 37 it receives an oil level signal.

A diagnosis plug 40 and a warning light 39 are connected to the control device 30 on the output side. The output signals of the control device 30 include the control signal ACV_ON for the loading valve 21 and the control signal CCV for the flow control valve 24 which controls the movement of the adjusting piston 13 of the viscous shear coupling 11.

Figure 2:
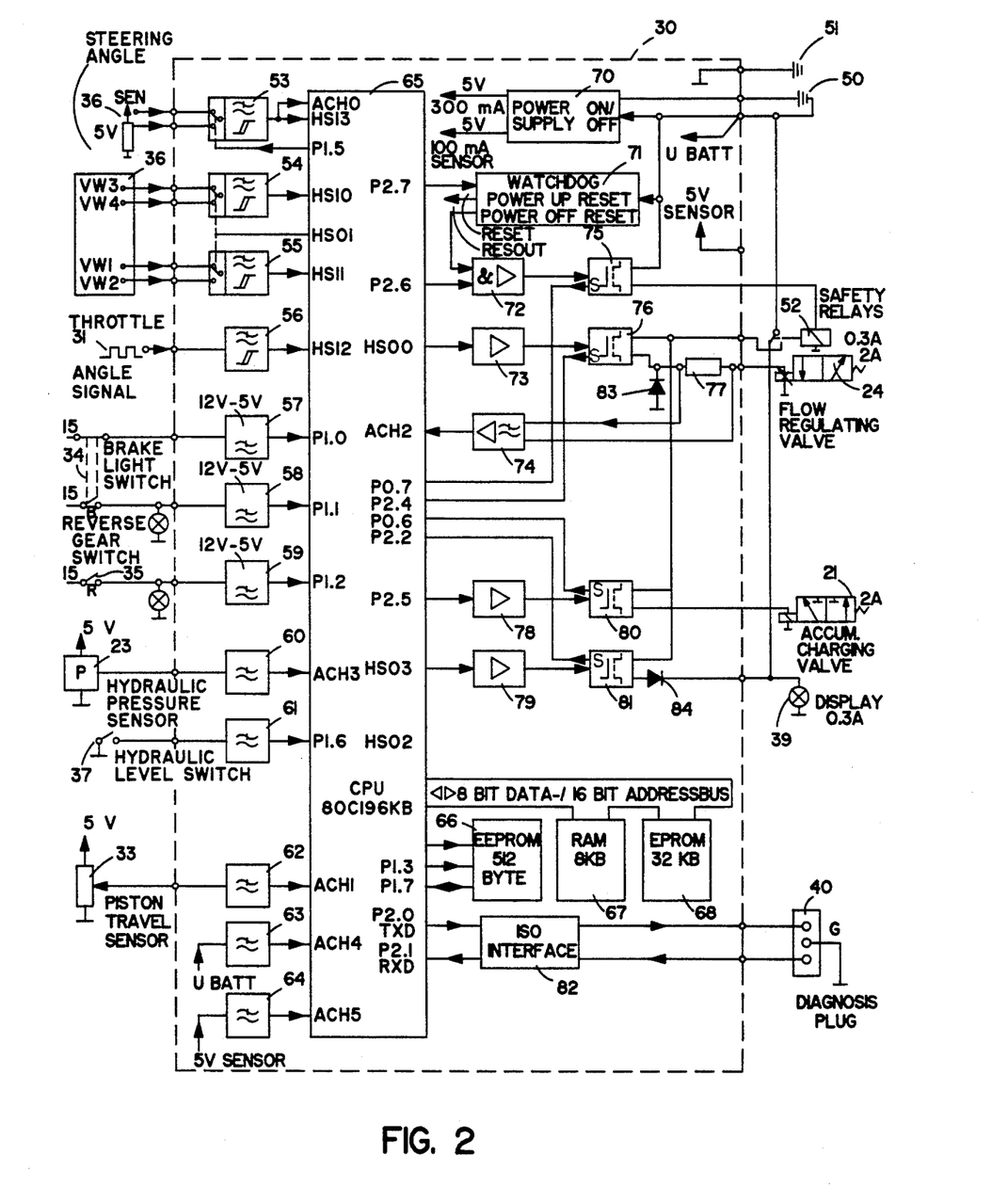
FIG. 2 shows a schematic representation of a control device for carrying out the process.

FIG. 2 shows a diagram of control device 30. For reasons of clarity the above-mentioned signal sources are shown on the left of the illustration. The signals are conveyed for conditioning via multiplexers 53, 54, and 55, and via signal converters 56 to 64 to the microprocessor 65 which is connected to a working memory 67, a program memory 68, and also an error memory 66. From top to bottom on the right side of the CPU 65, FIG. 2 shows: a voltage source 50 which supplies electrical energy via a current supply device 70; a ground contact 51; a watchdog unit 71 which resets the microcomputer in case of malfunctions and acts via amplification circuit 72 and power transistor 75 upon the safety relay 52; an operations amplifier 73 which acts upon the flow control valve 24 via the power transistor 76, whereby a recovery diode 83 ensures the continuous flow of current in the flow control valve 24 during the OFF phase of the power transistor; a shunt resistance 77 and an operational amplifier 74 with an integration element for the formation of mean values to ensure a stable feedback signal because of the digital triggering; operational amplifiers 78, 79 acting via power transistor 80 upon the loading valve 21, and via the power transistor 81 and diode 84 upon the warning light 39, respectively. Finally, an interface 82 for the connection of a diagnostics plug 40 is provided.

An example of the control process according to the invention is described below on the basis of FIGS. 3A–3E wherein the vertical block running through all these drawings on the left side represents the working memory 67, the signals entered therein being signals which have been received and remain there until they are updated.

The blocks in FIGS. 3A–3E following on the right side of the working memory 67 and connected to same by horizontal double-line arrows are groups of steps of the computer program contained in the program memory 68 belonging together and serving to solve a particular problem element, these being designated as modules hereinafter and being numbered from 1 to 14 (circled numbers in FIGS. 3A–3E).

The blocks on the right side of FIGS. 3A–3E which are connected by horizontal double-line arrows to the individual modules represent the arrival of data coming either from sensors, from stored values, or from stored characteristic diagrams. In all cases, the movements of signals are indicated through the horizontal arrows. The essential operations carried out in the different module boxes are symbolized therein through equations.

Figure 3A:
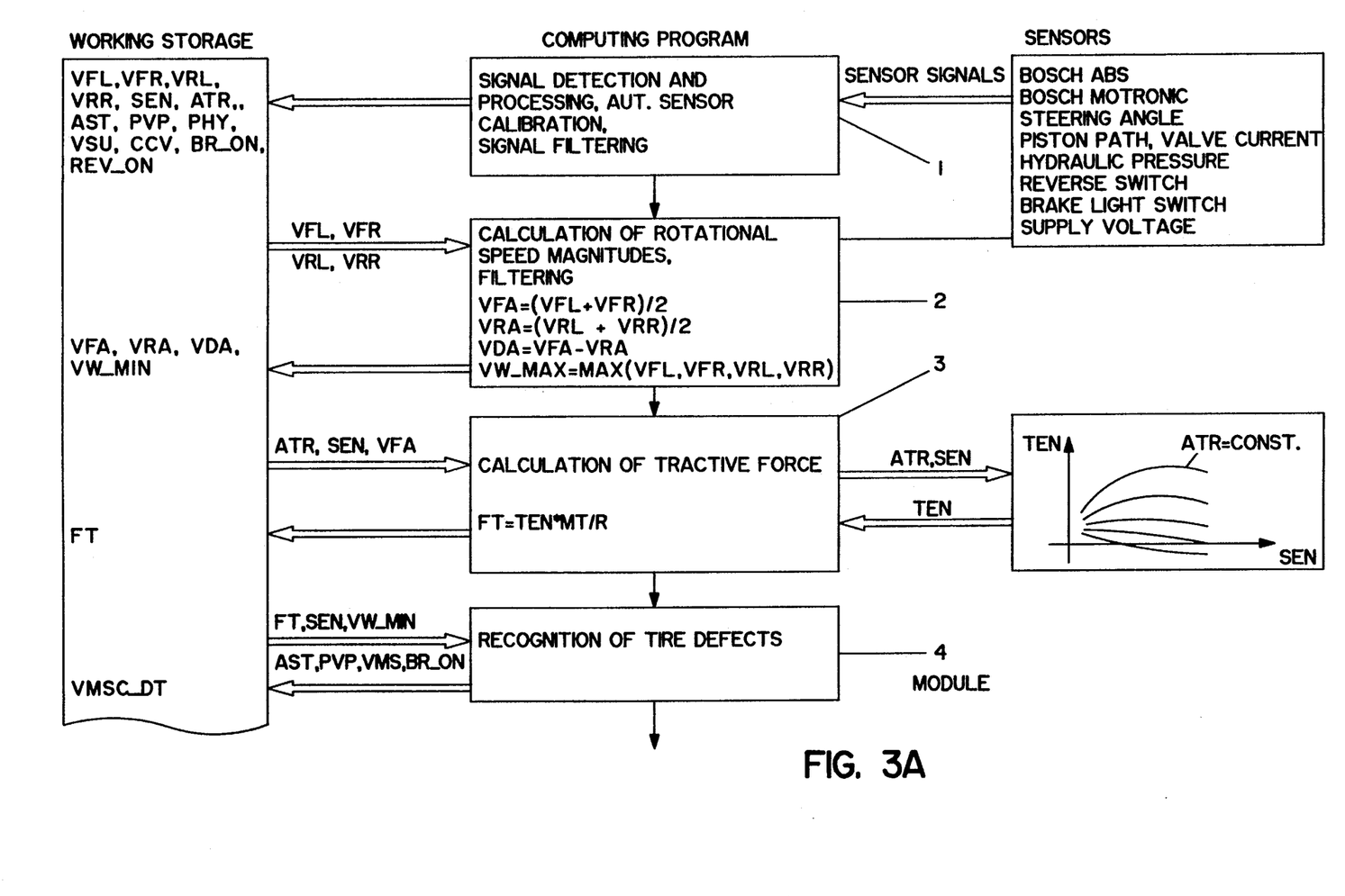
FIGS. 3A-3E show a flow-chart of the process according to the invention.
Figure 3B:
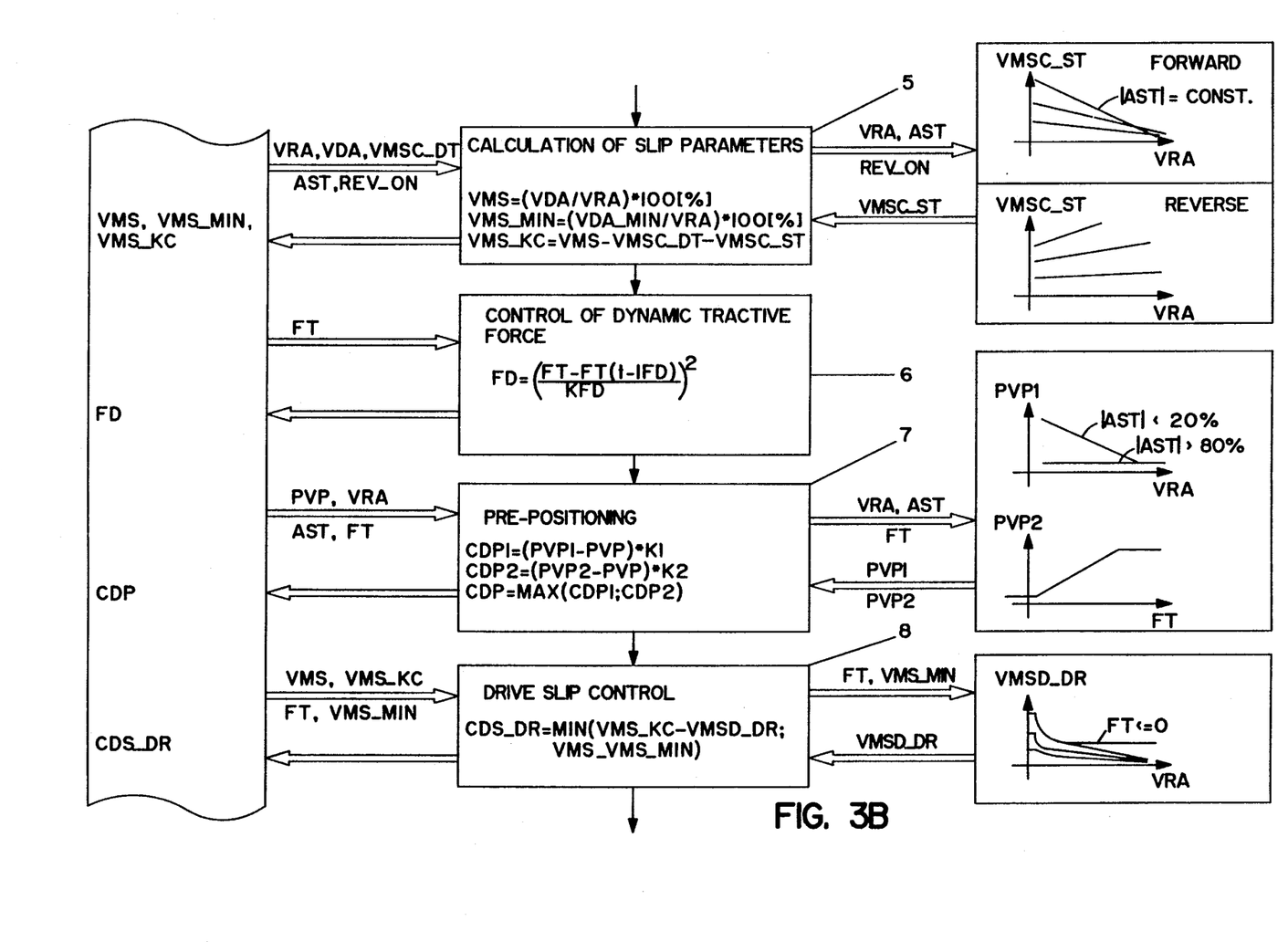
Figure 3C:
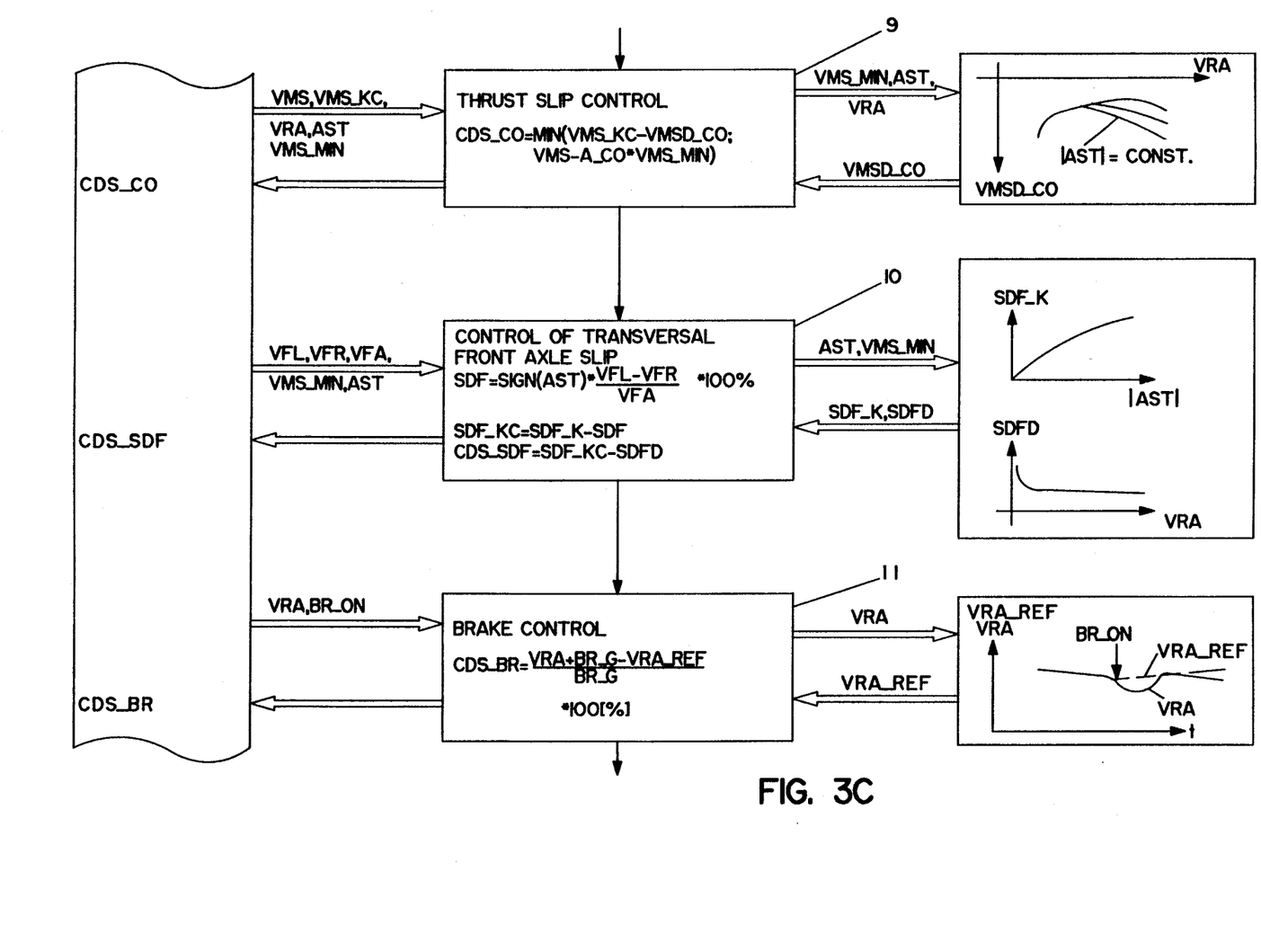
Figure 3D:
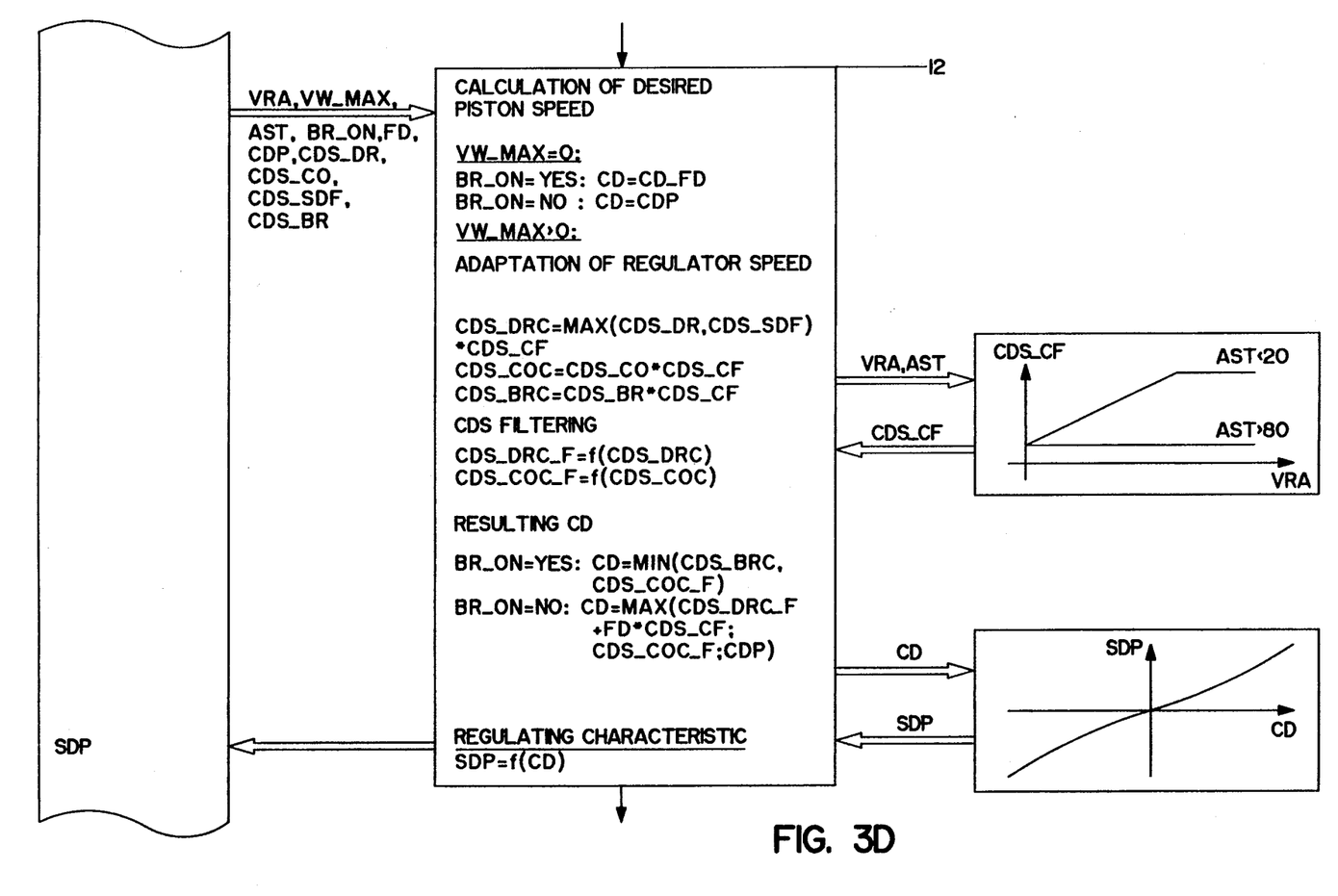
Figure 3E:
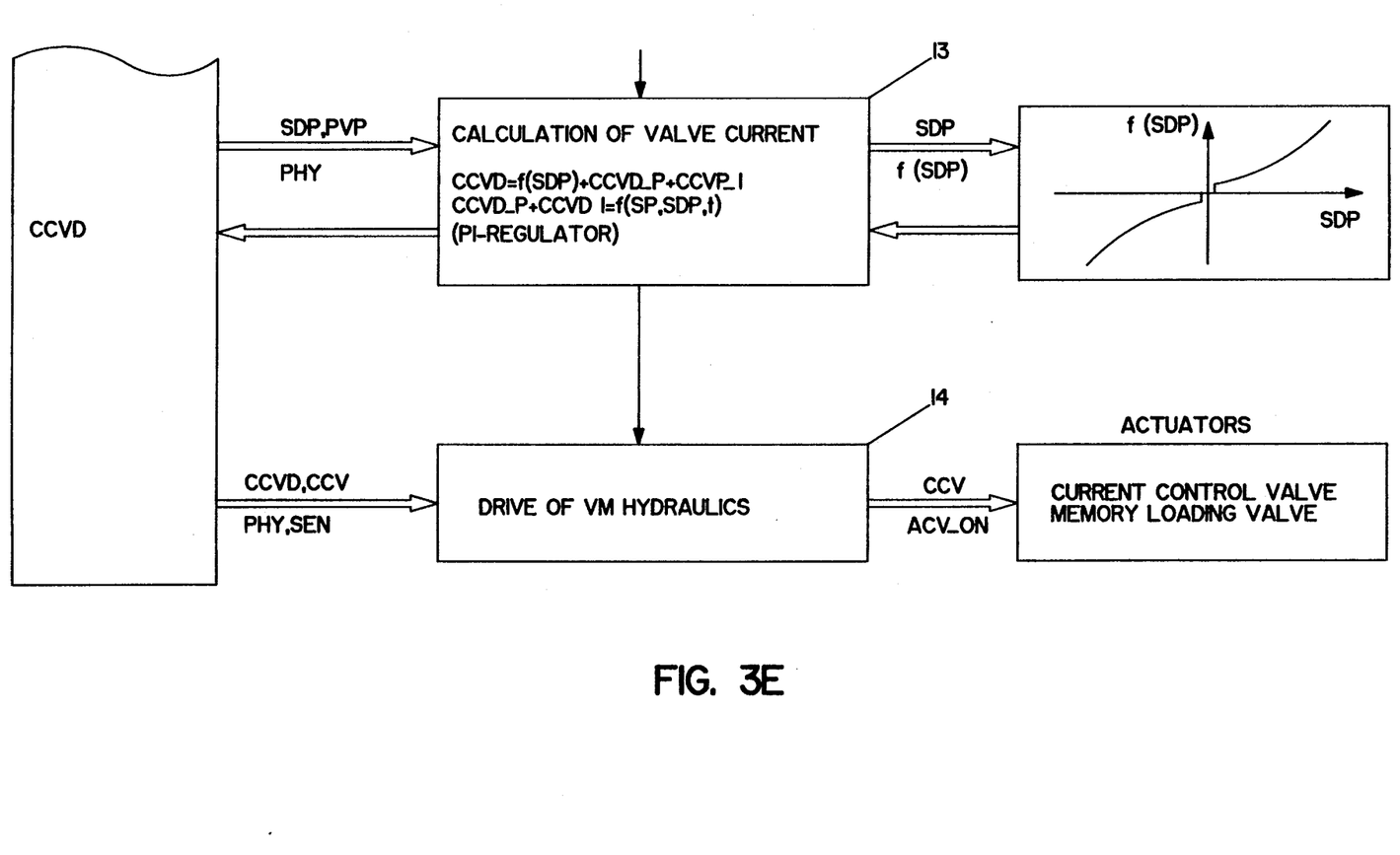

1. Signal Acquisition and Processing (Module 1)

In this program section, the input parameters needed for control are calculated in physical units. These are:

| | | |
|---|---|---|
| VFL, VFR, VRL, VRR | Wheel speeds | [r.p.m.] |
| SEN | Engine speed | [r.p.m.] |
| ATR | Throttle position | [%] |
| AST | Steering wheel angle | [%] |
| PVP | Piston position | [%] |
| PHY | Hydraulic-system pressure | [bar] |
| CCV | Valve current | [mA] |
| VSU | Distribution voltage | [V] |
| BR_ON | Brake signal | [-] |
| REV_ON | Reverse signal | [-] |

It should be noted that calculations are not necessarily carried out in the subsequent modules in the sequence indicated in the drawings, but as the signals are received over time from the individual sensors and signal converters.

2. Calculation of Basic Parameters (Modules 2, 3, 4, 5)

Module 2: Calculation of Rotational Speed Parameters and Filtering

Module 2 serves to calculate rotational speed parameters not measured directly which are required in several subsequent modules.

| | |
|---|---|
| $VFA = (VFL + VFR)/2$ | rotational speed of front axle |

-continued

| | |
|---|---|
| VRA = (VRL + VRR)/2 | rotational speed of rear axle |
| VDA = VFA − VRA | rotational speed difference VA/HA |
| VW_MAX | Greatest rotational speed |

As for the input signals, additional filtering of VFA, VRA and VDA can be programmed here too.

Module 3: Calculation of Tractive Force

From the throttle position signal ATR, the rotational speed of the engine SEN, and the rotational speed of the front axle VFA (in the case of permanent rear axle drive, from VRA), the current tractive engine force FT is calculated in module 3 as follows:

| Engine torque TEN: | |
|---|---|
| TEN = f(ATR, SEN) | Interpolation from stored characteristic diagram |
| Gear transmission MT: | |
| VFA < 100 RPM | MT = MT_MAX |
| VFA > 100 RPM | MT = SEN/VFA |
| MT > MT_MAX | MT = MT_MAX |
| MT < MT_MIN | MT = MT_MIN |
| | MT_MAX = 11 (first gear) |
| | MT_MIN = 2.8 (fifth gear) |

MT=MT_MAX is set when front axle speed is below 100 RPM, corresponding to a travel speed of approximately 10 km/h because wide fluctuations in rotational speed occur in this range. The overall limitation of MT by MT_MAX and MT_MIN ensures emergency operation if the engine speed signals fail (the calculation would then result in MT=0) or the front axle speed signals fail (the calculated MT would then be infinite).

Tractive force FT is calculated as follows:

| | |
|---|---|
| FT = MT*TEN/R, where R | Tire radius |

Module 4: Detection of Wheel Defect

In this module, different rolling circumferences indicative of a tire defect are detected and a tire defect value based on measured coupling slip is determined. This value is made available to determine the actual slip difference in module 5.

Different rolling circumferences may be caused by:
unequal tire wear
unequal tire pressure
installation of a spare tire
accidental installation of non-matching tires
tire control deviations, etc.

The algorithm for the detection of tire defects is broken down into two parts:
1. Detection of a travel condition in which the measured slip difference is caused by a tire defect or indicates that one has occurred, and
2. Continuous determination of a tire defect value for as long as this travel condition exists.

As to 1:

A suitable driving condition indicative of a tire defect may be detected by the following sequence of signals:
Fluctuation of coupling slip VMS < a limit value
Fluctuation of tractive force FT < a limit value
Fluctuation of the engine speed SEN < a limit value
Travel speed > a limit value
Steering angle AST < a limit value
Engine speed SEN < a limit value
Adjusting piston position PVP < a limit value
Brake not actuated,
the limit values being suitably selected.

The condition specified for the adjusting piston position means that the axles must be uncoupled to a great extent since the faulty gripping of the gears would otherwise falsify the measured results. If the signal configuration thus defined is permanent but has existed at least since an initializing time, the detection of the tire defect can be undertaken.

As to 2:

The momentarily existing slip value VMS is not well-suited for wheel defect detection because of normally occurring fluctuations in rotational speeds.

For this reason, a mean slip value VMSC_DTM is calculated over a defined distance (e.g. 20 m) as follows:
ΣVRA*dt > this defined distance: VMSC_DTM=ΣVDA*dt/ΣVRA*dt New-start integration: ΣVRA*dt=0; ΣVDA*dt=0

In this manner, a new mean slip value is obtained for every 20 meters, for example, and this mean slip value must meet the following additional requirements to be accepted as a measured wheel defect value:
VMSC_DTM < VMSC_DT for FT > FT_DTN since start of measure, or
VMSC_DTM > VMSC_DT for FT < FT_DTP since start of measure.

The following is achieved through these conditions:

If only a weak tractive force occurs between FT_DTN and FT_DTP during the entire detection period (rolling practically without load), the mean slip value is accepted without any other conditions as a measured wheel defect value.

If the tractive force is greater than FT_DTP, it may be assumed that only a positive tire slip difference occurs. If the mean slip value is therefore lower than the actual wheel defect, it is accepted as a measured value.

If the tractive force is lower than FT_DTN, it may be assumed that only a negative tire slip difference occurs. If the mean slip value is therefore greater then the present wheel defect, it is accepted as a measured value.

The current wheel defect VMSC_DT is obtained through the detection of a limited number of individual measured values:

$$VMSC\_DT = VMSC\_DT + (1/I+1)*(VMSC\_DTM - VMSC\_DT)$$

I > Imax: I = Imax, where I is the number of measurements since vehicle start.

Due to the fact that I is limited by Imax, the continuous detection changes according to Imax measured values into a filtering process with the filtering constant 1/Imax+1; a changed tire defect (e.g. installation of a spare wheel) is thereby updated relatively rapidly after vehicle start and is secured by continuous information without completely suppressing the influence of a new measured value after a long period of travel.

Module 5: Calculation of Slip Parameter

The slip between front and rear axle is calculated as follows:

$$VMS = (VDA/VRA)*100$$

A kinematically corrected tire slip difference between front and rear axle is calculated as follows:

$$VMS\_KC = VMS - VMSC\_DT - VMSC\_ST$$

where
VMSC_DT is a slip portion caused by different tire diameters, determined in module 4.
VMSC_ST is a kinematically caused slip portion when travelling through curves, detected from stored characteristic diagrams (in which the king pin inclination may also be taken into account) for forward and reverse travel as a function of steering angle and rotational speed of the rear axle.

A minimum slip difference is calculated as follows:

$$VMS\_MIN = (VDA\_MIN/VRA)*100,$$

where
VDA_MIN = constant.

VMS_MIN serves on the one hand as a basis for subsequent calculation of the desired slip values VMSD, and on the other hand represents the absolute minimum with regard to VMS for all slip adjustment processes in order to ensure reasonably correct flow direction of torque.

3. Adjustment (Modules 6, 7, 8, 9, 10, 11, 12)

This program section contains the travel-dynamically relevant elements of the control software. Modules 6 to 11 supply the control deviations of the different strategy elements; in module 12 a desired adjusting piston speed (SDP) for the coupling is calculated therefrom as the resulting control parameter.

Module 6: Dynamic Tractive Force Control

In this module a control parameter FD ("Dynamic Factor") is calculated from the course of the tractive force FT. The response of the vehicle to adjustments in case of sudden changes in load condition (gas surge or removal of gas) is improved by means of said control parameter FD.

$$FD = ((FT(t) - FT(t-IFD))/KFD)^2$$

where
IFD = time constant
KFD = constant

It is possible to define IFD and KFD differently for gas surge and for load change. The dynamic factor is then treated similarly to a control deviation. As a result, an acceleration of the piston movement in direction "hard" is achieved in case of gas surge and in direction "soft" in case of gas removal.

Module 7: Pre-positioning of Adjustment Piston

By pre-positioning the adjusting piston as a function of travel conditions, its movement is minimized. The setting times for slip control are thus reduced. Pre-positioning is carried out in three phases:

| a) Pre-positioning as a function of tractive force: | |
|---|---|
| CDP1 = (PVP1 - PVP)*K1 | Control deviation |
| PVP1 = f(FT) | Desired value of the adjusting piston value (from table) |
| K1 = | Adjusting speed factor |
| b) Pre-positioning as a function of steering angle and speed: | |
| CDP2 = (PVP2 - PVP)*K2 | Control deviation |
| PVP2 = f(AST, VRA) | Desired value of adjusting piston position |
| K2 = | Adjusting speed factor |
| c) Resulting control deviation: | |
| CDP = MAX(CDP1, CDP2) | |

In principle the adjusting piston is thereby set to the greater of the two desired values; however, different adjusting speeds are used for CDP1 and CDP2.

Module 8: Drive Slip Adjustment

It is the object of drive slip adjustment to limit positive tire slip differences between front and rear axles to a desired value as a function of tractive force and speed.

Two computing phases are contemplated:

a) Desired slip value:

The desired drive slip value VMSD_DR is calculated from the tractive force FT_and minimum slip VMS_MI according to the following equations:

$$FT > 0:$$
$$VMSD\_DR = VMS\_GDR + V\text{-}MS\_MI*A\_DR/(FT\_+B\_DR)$$

$$FT < 0: VMSD\_DR = MAX$$
$$(VMS\_GDR + VMS\_MI*A\_DR/B\_DR;$$
$$VMSD\_DRMA)$$

where:
VMS_GDR,
A_DR,
B_DR, and
VMSD_DRMA are suitably selected constants.

The selection of this function is made in accordance with travel dynamic and regulating requirements: The drive slip adjustment at FT<0 ensures full traction capability of the vehicle, even when the load condition has been misinterpreted (cold engine, sensor failure), whereby negative influences on other adjusting elements are avoided by the special desired value function.

The manipulation of the steering angle correction (module 5) furthermore affords the possibility of achieving indirectly a dependency of the desired slip value upon steering angle.

b) Control deviation:

The control deviation in the form of a difference between actual and desired value is calculated according to the following equation:

$$CDS\_DR = MIN (VMS\_KC - VMSD\_DR;$$
$$VMS - VMS\_MI)$$

The occurrence of a positive control deviation in the case of a negative rotational speed at the VC (Viscocoupling) viscous shear coupling is practically excluded by the additional computation of a control deviation from VMS and VMS_MI and by selecting the smaller one for CDS_DR. Faulty reactions such as regulator fluctuations and faulty gripping of the drive train which otherwise may be produced with negative kinematic slip portions are thus reliably avoided.

Module 9: Thrust Slip Adjustment

The object of thrust slip adjustment is to limit negative tire slip differences between front and rear axles to a desired value as a function of steering angle and speed. It is also made up of two computing phases:

a) Desired slip value:

The desired slip value VMSD_CO (Viscomatic ®, an all-wheel drive system incorporating viscous shear coupling, slip desired coast) is taken from a stored characteristics diagram as a function of steering angle AST and rear axle speed VRA:

$$VMSD\_CO = F(AST, VRA).$$

F(AST,VRA) is a function stored in the form of a table and containing optimal desired thrust slip values from a travel-dynamic point of view (e.g., behavior in curves under different travel conditions).

The thrust slippage adjustment is also active in drive, so that on the one hand influences of a faulty tractive force transmission are excluded, while on the other hand the restarting of an engine which might have been throttled by a braking action, for example, is assisted by the adjustment.

b) Control deviation:

The control deviation as a difference between actual and desired value is calculated according to the following function:

$$CDS\_CO = MIN\ (VMSD\_CO - VMS\_KC;\ VMS\_MI*A\_CO - VMS)$$

The additional computation of a control deviation from VMS and VMS_MI*A_CO and the selection of the smaller one for CDS_CO makes it in principle impossible for a positive thrust slip control deviation to occur with a positive rotational VC speed. Erroneous reactions such as regulator fluctuations and faulty gripping of the drive train which may otherwise be produced with positive kinematic slippage portions are thus reliably avoided.

Module 10: Front Axle Transversal Slip Adjustment

Transversal slip adjustment takes account of excessive slipping of the front wheels when they are located on the inside of a curve. It dominates mainly in the travel-dynamic limit zone (wheels on the inside of curve in the unstable zone) and prevents fluctuations and erroneous reactions of the drive slip adjustment by widely fluctuating rotational wheel speeds in that area.

a) Transversal slip:

$$SDF = sign(AST)*(VFL - VFR)/VFA *100\ [\%]$$

Tire slippage difference transversally (front inside—front outside):

$$SDF\_KC = SDF\_K - SDF$$

SDF_K = f(AST) kinematically caused transversal slippage b) Desired value:

$$SDFD = SDFD\_G + A\_SDF*VMS\_MIN$$

SDFD_G = suitably selected constant
A_SDF = suitably selected constant

A dependency of the desired value on the steering angle is provided by manipulation of SDF_K.

c) Control deviation:

$$CDS\_SDF = SDF\_KC - SDFD$$

Module 11: Brake Adjustment

It is the object of brake adjustment to maintain thrust slip adjustment (from Module 9) with light braking in order to avoid one-sided overbraking of the front axle due to engine thrust (relev. on My-low, i.e., conditions of low coefficient of friction between the road surface and the vehicle tires such as a slippery road surface). At the same time overbraking of the rear axle by the drive system should however be avoided under any circumstance.

a) Determination of a rotational reference speed:

The rotational reference speed VRA_REF is calculated on the basis of the rotational speed of the rear axle measured at the beginning of brake application and extrapolated along a descending straight line with constant deceleration.

b) Control deviation:

The control deviation CDS_BR is calculated on the basis of the following formula:

$$CDS\_BR = (VRA - VRA\_REF + BR\_G)/BR\_G*100\ (\%)$$

BR_G = suitably selected rotational speed threshold.

If the rear axle speed drops below VRA−BR_G, a negative control deviation CDS_BR results so that an absolute soft setting of the Viscomatic ® or VM drive system is thereupon produced.

Module 12: Calculation of the Desired Piston Speed

In this software module, the desired adjusting piston speed SDP is calculated from the control deviations calculated in modules 6 to 11. For this, a distinction is made between two cases:

First case: VW_MAX < 27 rpm (vehicle at a standstill)

If BR_ON = yes (brake actuated): SDP = SDP_FDC rapid adjustment;

If BR_ON = no (brake not actuated): CD = CDP resulting control deviation

If all wheel speeds are less than the smallest reliable measured value of 27 rpm, only pre-positioning or rapid adjustment in case of braking is carried out, since all adjusting elements depending on rotational speed supply undefined values.

Second case: VW_MAX > 27 rpm:

a) Adaptation to the adjuster speed:

As a function of driving conditions and road conditions the behavior of the adjusting distance changes (e.g., the stiffness of the tire in longitudinal direction decreases as lateral force increases or wheel load decreases). Rotational speed fluctuations, e.g., due to uneven road or oscillations in the drive train exert different influences upon the control deviations. This circumstance is taken into account by multiplying individual control deviations by an adjusting speed factor dependent upon steering angle and speed.

CDS_CF = f(AST, VRA) adjusting speed factor from table
CDS_DRC = MAX(CDS_DR, CDS_SDF)*CDS_CF The results of drive slip adjustment and transversal slip adjustment are already combined in CDS_DRC.

CDS_COC = CDS_CO*CDS_CF
CDS_BRC = CDS_BR*CDS_CF b) Filtering the control deviation:

Most of the filtering which is necessary for smooth adjusting behavior is not done on the input signals but at the control deviations, since only a special logic can be filtered here in view of minimizing piston movement. Actual filtering is not involved here, but rather drastic reduction of interference-caused control deviations in direction of zero (adjusting piston stands still).

The manner in which the filter operates is not discussed here; the filtered control deviation is referred to below by index _F.

c) Resulting control deviation:

When the brake is actuated (BR_ON = yes): CD = MIN(CDS_BRC_F, CDS_COC_F)

As the brake is actuated, the thrust slip control deviation is limited by the brake control deviation (negative high value and high deceleration of rear axle). Additional adjusting elements are not used.

When the brake is not actuated (BR_ON=no):
CD=MAX((CDS_DRC_F+FD*CDS_CF), CDS_COC_F, CDP)

The resulting deviation for normal travel is determined as a maximum of deviation of drive slip adjustment plus reduced dynamic factor, of thrust slip adjustment and of pre-positioning.

d) Adjustment characteristic:

The desired piston speed is calculated from a stored table from the resulting control deviation:

$$SDP = f(CD)$$

4. Driving the Coupling Hydraulics (Modules 13 and 14)

In this program portion the necessary electrical current is calculated and regulated at the control valve of the VM unit to achieve desired piston speed.

Module 13: Calculation of Valve Current

This module includes the algorithm for the computation of the electric current CCVD of the flow regulating valve 24 to be adjusted to achieve the desired piston speed SDP indicated by module 12.

The logic achieves piston control by means of a characteristic curve of valve 24 superimposed with PI regulation (i.e., regulation which is a function of the control deviation and the integral of the control deviation) which compensates for the characteristic line control deviations and improves the response behavior.

---
Resulting valve current:
CCVD = f(SDP) + CCVD_P + CCVD_I
f(SDP)          stored characteristic valve curve
CCVD_P, CCVD_I  additional flow from PI regulator.
---

Module 14: Operation of Actuator

The control of the actuators of the coupling hydraulics is effected in this module.

The valve current indicated by module 13 is set by means of a PID regulator (i.e., regulation which is a function of the control deviation, its integral and its derivative) on the flow setting valve and the hydraulic pressure is held between 80 and 95 bar by actuating the storage loading valve.

While the invention has been described by reference to a specific embodiment, this was for purposes of illustration only. Numerous alternative embodiments will be apparent to those skilled in the art without departing from the spirit and scope of the invention.

We claim:

1. A viscous shear coupling for distributing torque between front and rear axles of an all-wheel drive vehicle, comprising
   a housing,
   a set of inner blades interdigitating with a set of outer blades, said inner and outer blades being axially spaced apart and axially slidably mounted within said housing,
   a viscous liquid located within said housing,
   an adjusting piston within said housing which is axially displaceable to adjust an axial distance between adjacent ones of said blades, and
   control means for controlling the speed of said adjusting piston,
   wherein said control means includes a control pressure circuit which delivers a control pressure fluid to said adjusting piston and at least one control valve in said control pressure circuit which regulates the delivery of said control pressure fluid to said adjusting piston thereby controlling the speed of said adjusting piston, and
   wherein said control means further includes means for calculating a desired adjusting piston speed (SDP) from travel conditions of said vehicle operatively connected to said control valve, and wherein said control valve comprises a proportional vale which adjusts the speed of said adjusting piston to said desired adjusting piston speed.

2. The viscous shear coupling of claim 1 wherein said calculating means comprises a microcomputer with a memory for storing a program for calculating said desired adjusting piston speed.

3. A process for controlling a viscous shear coupling which distributes torque between front and rear axles of an all-wheel drive vehicle, said viscous shear coupling comprising a housing, a set of inner blades interdigitating with a set of outer blades, said inner and outer blades being axially spaced apart and axially slidably mounted within said housing, a viscous liquid within said housing, and an adjusting piston within said housing which is axially displaceable to adjust an axial distance between adjacent ones of said blades, said process comprising
   acquiring a set of signals indicative of driving conditions of said vehicle and converting them to a set of input parameters,
   converting said input parameters to a set of basic parameters,
   ascertaining a set of control deviations from said input parameters and said basic parameters,
   calculating a desired adjusting piston speed (SDP) from said control deviations, and
   adjusting the speed of said adjusting piston to said desired adjusting piston speed.

4. The process of claim 3 wherein said viscous shear coupling further comprises a control pressure circuit for delivery of a control pressure fluid to said adjusting piston and a control valve in said control pressure circuit which regulates the delivery of said control pressure fluid to said adjusting piston, and wherein said process further comprises,
   calculating a desired valve current (CCVD) for said desired adjusting piston speed (SDP), and
   adjusting a valve current (CCV) delivered to said control valve to said desired valve current (CCVD).

5. The process of claim 4 wherein said input parameters include: rotational wheel speeds (VFL, VFR, VRL, VRR), steering angle (AST), rotational engine speed (SEN), engine throttle setting (ATR), and optionally brake signal (BR_ON) and reverse signal (REV_ON).

6. The process of claim 5 wherein said basic parameters include: rotational axle speeds (VFA, VRA), axle speed difference (VDA), tractive force (FT), slip between front axle and rear axle (VMS), and kinematically corrected slip (VMS_KC).

7. The process of claim 6 wherein said control deviations include: drive slip adjustment (CDS_DR), thrust slip adjustment (CDS_CO), and front axle transversal slip adjustment (CDS_SDF).

8. The process of claim 7 wherein said adjusting piston speed (SDP) is calculated from said control deviations by using a stored characteristic valve curve (f(SDP)).

9. The process of claim 8 wherein an engine torque (TEN) is calculated from the engine throttle setting (ATR) and the rotational engine speed (SEN), an engine transmission (MT) is calculated from the rotation engine speed (SEN) and the front axle speed (VFA), and the tractive force (FT) is calculated from the engine torque (TEN) and the engine transmission (MT).

10. The process of claim 9 wherein said engine transmission (MT) is limited between a selected maximum engine transmission value (MT_MAX) and a selected minimum engine transmission value (MT_MIN).

11. The process of claim 10 wherein said engine transmission (MT) is set equal to said maximum engine transmission value (MT_MAX) if one of said rotational axle speeds (VFA, VRA) is lower than a predetermined minimum value.

12. The process of claim 11 wherein said predetermined minimum value is about 100 rpm.

13. The process of claim 12 wherein said maximum engine transmission value (MT_MAX) is selected so that it is lower than an actual transmission in lowest gear.

14. The process of claim 7 further comprising calculating a wheel defect (VMSC_DT) as an additional basic parameter.

15. The process of claim 7 wherein said wheel defect (VMSC_DT) is calculated when, during an initialization time (TI_DT), at least the following conditions are met: fluctuations of the slip (VMS), the tractive force (FT), the rotational engine speed (SEN), and the steering angle (AST) are less than respective limit values, travel speed is greater than a limit value, and adjusting piston position (PVP) is less than a limit value; and wherein said wheel defect (VMSC_DT) is calculated as a mean slip value (VMSC_DTM) by integration over a fixed distance.

16. The process of claim 15 wherein said mean slip value (VMSC_DTM) is used as said wheel defect (VMSC_DT) only if the tractive force (FT) is between selected limit values (FT_DTN, FT_DTP), or, when the tractive force (FT) is outside the selected limit values (FT_DTN, FT_DTP), only if the mean slip value (VMSC_DTM) is smaller than said wheel defect (VMSC_DT) in case said tractive force (FT) is positive or greater than said wheel defect (VMSC_DT) in case said tractive force (FT) is negative.

17. The process of claim 16 wherein said mean slip value (VMSC_DTM) is determined by averaging changes in measured values as compared with actual tire defect over a predetermined number of individual measured values and, when this predetermined number has been exceeded, weighting the changes with a constant factor, wherein counting is started anew with each vehicle start.

18. The process of claim 7 wherein a kinematically corrected slip value is obtained from the slip value (VMS) by subtracting a kinematically caused slip part (VMSC_ST) occurring during turns of said vehicle and said wheel defect (VMSC_DT), said kinematically caused slip part (VMSC_ST) being taken from stored characteristics as a function of said steering angle (AST) and said travel speed (VRA).

19. The process of claim 7 further comprising calculating a dynamic factor (FD) from said tractive force (FT) over time, said dynamic factor (FD) being treated as a control deviation in subsequent process stops.

20. The process of claim 7, wherein individual control deviations (CDP1, CDP2) of an adjusting piston position (PVP) are calculated as a difference between desired values of adjusting piston position (PVP1, PVP2) multiplied by adjusting speed factors (K1, K2) and the adjusting piston position (PVP), the desired values of the adjusting piston position (PVP1, PVP2) being obtained from stored characteristics as a function of said rear axle speed (VRA), said steering angle (AST) and said tractive force (FT), and wherein a prepositioning control deviation (CDP) is selected as a maximum from the individual control deviations (CDP1, CDP2).

21. The process of claim 7, wherein said drive slip control deviation (CDS_DR) s determined by calculating a desired drive slip value (VMSD_DR) from the tractive force (FT) and from the rotational axle speeds (VRA, VFA), and calculating said drive slip control deviation (CDS_DR) by selecting a minimum from: a difference between a kinematically corrected slip (VMS_KC) and said desired drive slip value (VMSD_DR), and a difference between said slip (VMS) and a selected positive minimum slip (VMS_MI).

22. The process of claim 7, wherein the thrust slip control deviation (CDS_CO) is determined by calculating a desired thrust slip value (VMSD_CO) from the rotational axle speeds (VRA, VFA) and from the steering angle (AST), and calculating the thrust slip control deviation (CDS_CO) through selection of a minimum of a difference between said desired thrust slip value (VMSD_CO) and a kinematically corrected slip (VMS_KC), and a difference between a negative minimum slip, (VMS_MI) and the slip (VMS).

23. The process of claim 7, wherein said front axle transversal slip control deviation (CDS_SDF) is determined by calculating a slip between left and right front wheels (SDF), calculating a kinematically corrected transversal slip (SDF_KC) as a difference between a kinematically caused transversal slip part (SDF_K) taken from a stored curve as a function of steering angle (AST) and the transversal slip (SDF), calculating a desired transversal slip value (SDFD) from the rotational axle speeds (VFA, VRA), and determining the transversal front-axle slip control deviation (CDS_SDF) as a difference between the kinematically corrected transversal slip (SDF_KC) and the desired transversal slip value (SDFD).

24. The process of claim 7, wherein a braking control deviation (CDS_BR) is determined by calculating a rotational reference speed (VRA_REF) from the rotational rear axle speed (VRA) at the beginning of braking extrapolated along a straight line with suitably selected constant deceleration (VRA_DLI), and calculating the braking control deviation (CDS_BR) from the rotational rear axle speed (VRA) and the rotational reference speed (VRA_REF).

25. The process of claim 7, wherein the desired piston speed (SDP) is determined by calculating a resulting control deviation (CD) through minimum selection from terms formed by compilation from individual control deviations (CDS_SFD, CDS_DR, CDS_CO, CDP1, CDP2, CDP) and an analog parameter (FD) multiplied by a control speed factor (CDS_CF), and calculating the desired piston speed (SDP) from the resulting control deviation (CD).

26. The process of claim 25, wherein the determination of the resulting control deviation (CD) by minimum selection from the individual control deviations (CDS_BR) and (CDS_CO), each multiplied by said control speed factor (CDS_CF) upon braking said vehicle.

27. The process of claim 26, wherein the individual control deviations (CDS_DR, CDS_CO, CDS_SDF, CDS_BR) are filtered individually and the resulting control deviation (CD) is then formed therefrom.

* * * * *